(12) United States Patent
Hessing

(10) Patent No.: US 6,334,089 B2
(45) Date of Patent: *Dec. 25, 2001

(54) VEHICLE ROUTING AND GUIDANCE SYSTEM

(75) Inventor: Bernd Hessing, Holle (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,171

(22) Filed: Aug. 26, 1998

(30) Foreign Application Priority Data

Aug. 27, 1997 (DE) .............................................. 197 37 256

(51) Int. Cl.$^7$ .................................................. G01C 21/00
(52) U.S. Cl. ........................... 701/209; 701/24; 701/200; 73/178 R; 342/463
(58) Field of Search .................................. 701/23, 24, 25, 701/26, 200, 201, 202, 207, 208, 209, 210; 340/988, 990, 995; 73/178 R; 342/457, 463, 357.13

(56) References Cited

U.S. PATENT DOCUMENTS 5,568,390 * 10/1996 Hirota et al. ........................ 701/201
5,699,056 * 12/1997 Yoshida ................................ 340/905
5,757,289 * 5/1998 Nimura et al. ....................... 304/995

FOREIGN PATENT DOCUMENTS

| 41 39 581 A1 | 6/1993 | (DE) . |
| 0 715 289 A2 | 6/1996 | (EP) . |
| 0 814 448 A2 | 12/1997 | (EP) . |

* cited by examiner

*Primary Examiner*—Yonel Beaulieu
(74) *Attorney, Agent, or Firm*—Michael J. Striker

(57) ABSTRACT

The vehicle routing and guidance system includes a vehicle-based navigation system (35) located in a vehicle, which includes an input device (38) for entry of one or more destinations (B) to which the vehicle is to travel and a self-locating device for determining location of the vehicle, a central server 12 located outside of the vehicle for making navigational information available to the navigation system, for determining a route (16) to the destination or destinations (B) provided to the navigation system and for dividing the route (16) piecewise into route sections (34), and transmitter and receiver devices for at least temporarily establishing communication between the central server (12) and the navigation system (35) to transmit the route sections (34) separately to the navigation system (35) so that the route (16) is transmitted in a piecewise manner to the navigation system (35).

18 Claims, 3 Drawing Sheets

VEHICLE ROUTING AND GUIDANCE SYSTEM

BACKGROUND OF THE INVENTION

1. Field of the Invention

The present invention relates to a vehicle routing and guidance system and, more particularly, to a vehicle routing and guidance comprising a navigation system that includes a self-locating means for the vehicle and a central server for making of navigational information available to the navigation system, whereby the navigational system communicates with the central server at least temporarily by means of transmitter and receiver devices.

2. Prior Art

Vehicle-based navigation systems are known for guidance of vehicles. These systems use map information required for navigation in the vehicle in order to guide the vehicle to a destination point predetermined by the operator of the vehicle. All information required for the entire route is supplied in the vehicle. It is disadvantageous however that a correspondingly large memory capacity is required for the memory used in the navigation system for a number of different destinations over a comparatively large region or territory. Furthermore it is also disadvantageous that information effecting the destination of the vehicle, for example detours, road blockages and so on, is not considered.

Furthermore central server for preparation of navigational data are known, by means of which routes corresponding to a destination predetermined by the operator of the vehicle are transmitted to the vehicle-based navigation system. The entire navigational information for the chosen destination is transmitted. It is disadvantageous therefore that a comparatively large amount of information is to be transmitted and changes during travel over the route can no longer be considered.

By "route" a section of a digital chart or map with at least one destination, which is useable in a vehicle-based navigation system, is to be understood. For guidance to the destination the vehicle must be located on the digital chart, which means the route.

Furthermore vehicle routing and guidance systems are known that include traffic guidance devices arranged at fixed locations along a path of travel of the vehicle, by means of which navigational information corresponding to the selected route is transmitted from those traffic guidance devices that the vehicle passes during its travel.

SUMMARY OF THE INVENTION

It is an object of the present invention to provide an improved vehicle routing and guidance system that does not have the above-described disadvantages.

These objects, and others which will be made more apparent hereinafter, are attained in a vehicle routing and guidance system comprising a vehicle-based navigation system that includes a self-locating means for the vehicle and a central server for making navigational information available to the navigation system, whereby the navigation system communicates with the central server at least temporarily by means of transmitter and receiver devices.

According to the invention, the navigation system includes an input device by which at least one destination is input thereto, the central server includes means for determining a route for the vehicle from the at least one destination and means for transmitting the route determined from the at least one destination piecewise to the navigation system.

The vehicle routing and guidance system according to the invention has the advantage that it provides an efficient dynamic guidance to a destination, which means that actual changes by means of additional further transmissions of navigational information are possible during travel of the vehicle over the route, by determining the position of the vehicle by means of a comparatively simple built-in vehicle-based navigational system, for example a GPS, and by an exchange of comparatively little information for route guidance with the central server communicating with the navigational system. It is advantageously possible to provide the required memory capacity needed for the route section prepared by the central server in the memory of the vehicle-based navigation system because the navigation system includes an input device by which at least one destination is input thereto, the central server includes means for determining a route for the vehicle from the at least one destination and means for transmitting the route determined from the at least one destination piecewise to the navigation system. The term piecewise transmission' means that each route section is transmitted to the vehicle-based navigation system only when the previous route section has been traversed. By piecewise transmission of the entire route in route sections prior to reaching the destination, changes can be considered in sections or parts of the route over which the vehicle has not traveled during its travel over the route and can be transmitted to the navigation system. Thus dynamic navigational information of significant events which are comparatively far removed from the actual position of the vehicle can be made available to the navigation system over the entire route, without adding memory capacity in the vehicle-based navigation system and additional data transmission capacity for communication between the navigation system and the central server. When an actual position of the vehicle transmitted to the central server is just in the next route section, the actual route section already prepared by the central server is then transmitted to the navigation system of the vehicle.

In another embodiment the vehicle routing and guidance system according to the invention comprises a vehicle-based navigation system located in a vehicle, a central server for making navigational information available to the navigation system including means for establishing a communications link between the navigation system and the central server prior to start of travel of the vehicle for transmission of a most updated route for vehicle travel from a predetermined destination from the central server to the navigation system and transmitter and receiver means for at least temporarily establishing communication between the central server and the navigation system. This embodiment provides the advantage that the vehicle-based navigation system can be loaded with an updated or actual route according to the destination selected immediately prior to start. Since the navigation system is connected with the central server prior to the start of travel so that the updated route derived from the predetermined destination by the central server is read into the navigation system, it is advantageously possible to take into account all traffic information since the beginning of travel in preparing the travel route. The vehicle-based navigation system needs no large memory capacity to set up routes to all eventually possible destinations since only the actual route associated with the particular actual destination is copied into the navigation system and needs to be stored in it. Furthermore travel or traffic information, for example, street blockages, current traffic density, traffic predictions and the like, can be taken into account in preparing the route in a timely manner up to the start of travel. It is preferable when the navigation system is connected with the central server by means of a telecommunications server, for example a wired or wireless telecommunications network, for copying of the route information.

In another preferred embodiment of the invention certain selectable, for example repeatedly used routes, are stored in the navigation system. The route corresponding to the actually selected route is updated by the central server via the communications link before travel starts. Thus dynamic navigational information is made available in the vehicle results, which means taking updated traffic information into consideration.

Additional advantageous embodiments of the invention result from other features claimed in the appended dependent claims.

BRIEF DESCRIPTION OF THE DRAWINGS

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1A:
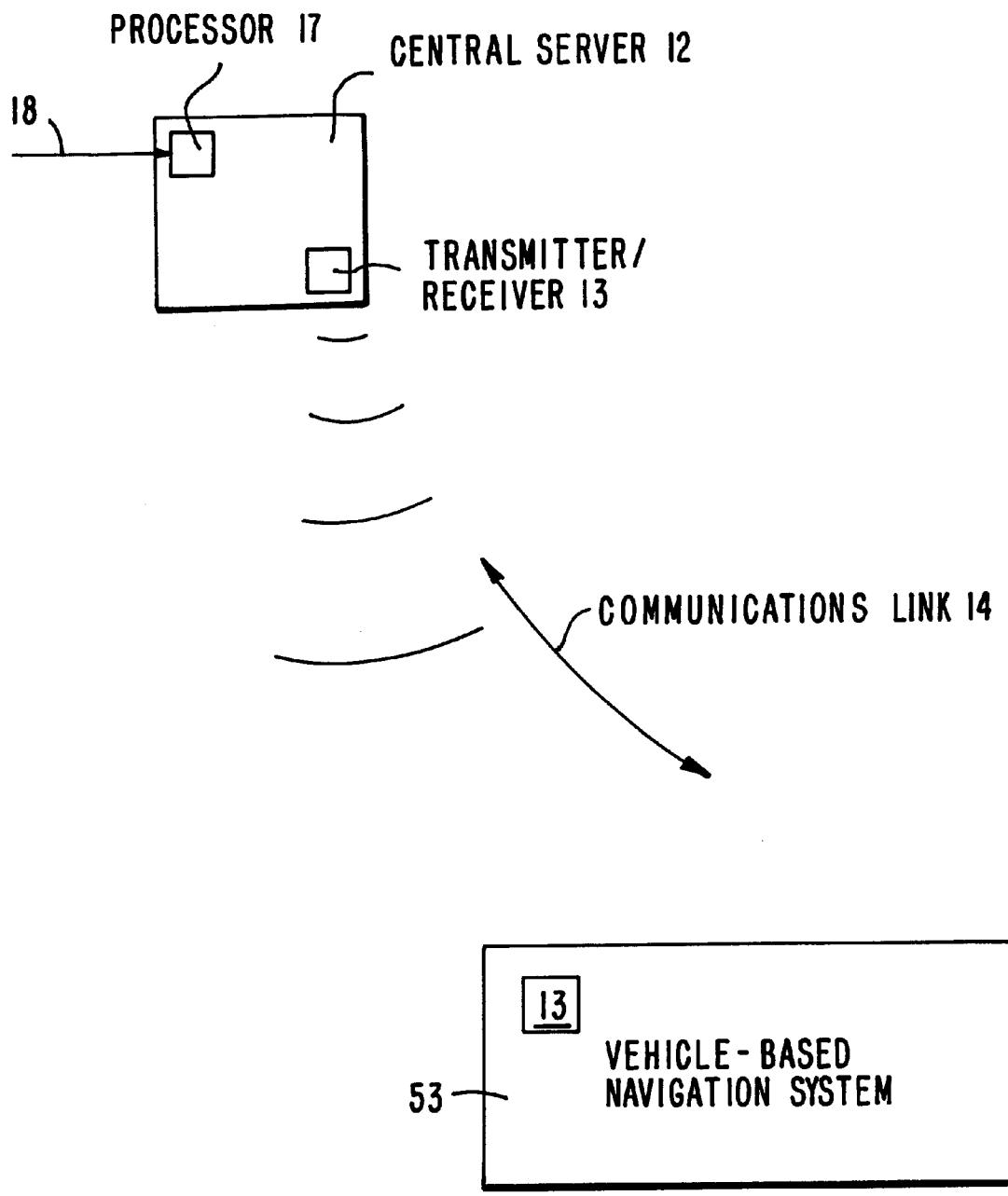
FIG. 1a is a simplified block diagram of a central server for a vehicle routing and guidance system according to the invention; of FIG 1b is a portion of a map showing a starting point and destination used by the vehicle routing and guidance system according to the invention.
Figure 1B:
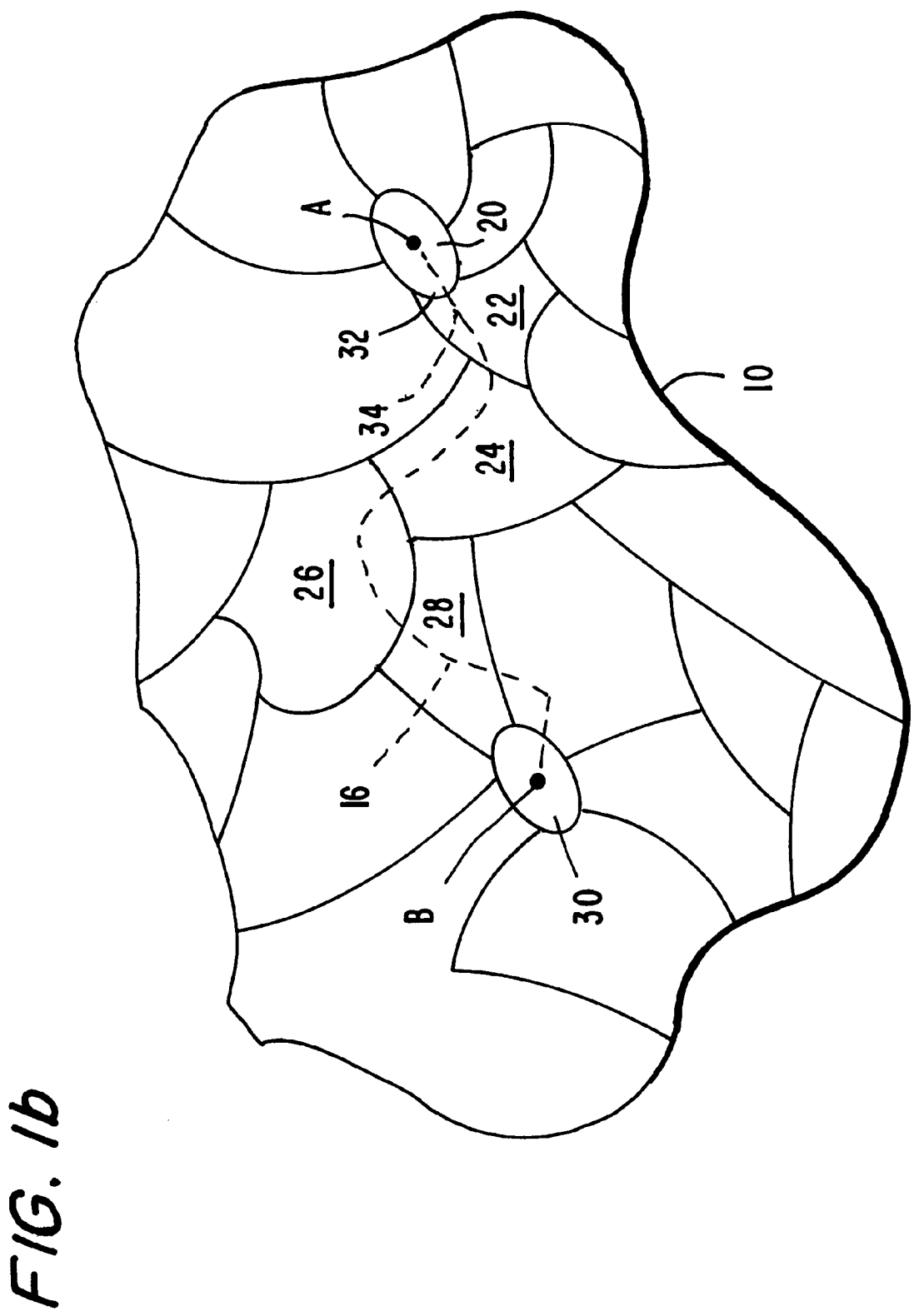

A map 10 is shown schematically in FIG. 1b, with the aid of which the vehicle routing and guidance system according to the invention is explained in more detail. The present example is based on an unshown motor vehicle traveling from a starting point A on the map to a destination B. The driver of the vehicle enters the destination B into his vehicle-based navigation system 53 at the starting point A. The navigation system 53 a central server 12 located outside the vehicle sets up a wireless communications link 14 with the central server 12 as shown in FIG. 1a. The communications link 14 can be made, for example, by cellular telephone. The vehicle and also the central server have receiver and transmitter devices 13.

The central server 12 conducts the information, namely the aforementioned destination B, to a processor 17, which computes an optimum route 16 for reaching the destination with the aid of a detailed map of the entire area stored in the processor 17. This route 16 is produced from the stored map 10 and additional actual external traffic information 18, with which the central server is continuously provided. The traffic information 18 can include, for example, information regarding blocked streets, traffic congestion, unfavorable weather conditions and the like.

The route 16 is transmitted to the vehicle piecewise by means of the communications link 14 considering the traffic information 18 and the map 10. The individual sections of the route 16 are transmitted to the vehicle according to a previously established division of the map 10. The map 10 is divided into certain region, of which here, for example, the region 20, region 22, region 24, region 26, region 28 and region 30 are named. The division of the regions 20 to 30 and also other unshown region can be according to geographic conditions, administrative organizations (districts, municipalities, townships and so forth) or other freely selectable criteria. The individual regions 20 to 30 border each other at respective transition points 32(For simplicity of illustration only one transition point 32 is shown in FIG. 1, but they exist between all regions of the map 10). The division of the regions with the aid of travel-specific border conditions is advantageous. A partial route or route section can be, for example, limited to one region on the highway during a long-distance journey on the highway and cover a comparatively large distance. The route covers all streets during a city trip and covers a comparatively small distance.

The best route 16 for the vehicle is determined in the central server 12, separately acquired and stored in the central server according to the requirements of the vehicle that travels from starting point A to destination B. For example, the route 16 passes through the regions 20, 22, 24, 26, 28 and 30. First a first section 34 of the route 16, which is associated with the section or portion of the route 16 in the region 20, is copied to the navigation system of the vehicle. A detailed digital map exclusively for the region 20 is transmitted to the navigation system of the vehicle. Since the navigation system of the vehicle does not detect and store the entire detailed map 10, but only the region 20, a correspondingly small memory capacity is provided in the navigation system. Next the transition point 32 between the regions 20 and 22 is provided as an intermediate destination for the navigation system of the vehicle. This means that the driver of the vehicle obtains no information from this intermediate goal regarding when he will arrive at the destination B. The autonomous intermediate destination at the transition point 32 between the regions 20 and 22 is however the apparent destination for the navigation system of the vehicle.

The navigation system of the vehicle can provide the driver or operator with the required information in different ways, for example by display of a suitable map on a display device, by a digital speech synthesizer or other digital or analog devices for guiding the vehicle.

The central server 12 detects an approach of the vehicle to the transition point 32 between the regions 20 and 22 by means of the navigation system in the vehicle. The next section of the route 16, which, in the indicated example, is in region 22, is copied to the navigation system of the vehicle by means of the receiver and transmitter devices 13 when the vehicle reaches the transition point 32 or shortly prior to reaching the transition point 32. Since the region 20 has already been traversed, the navigational information for it can be erased. Thus no additional memory capacity is required.

When the portion of the route 16 in the region 22 is first copied to the navigation system on reaching the transition point 32, traffic information 18 generated since the start of the journey from the starting point A can be processed by the processor 17 and considered in set up the actual or updated route 16 to be traveled. The internal route that is set up by the central server 12 can change during the actual travel over the route 16 without the driver's knowledge. The copying of the next section of the route on reaching the next transition point between the regions 22 and 24 occurs in an analogous manner, which means in this case copying the section of the route in the region 24 from the central server 12 to the navigation system of the vehicle. This process is continued until the destination B is reached.

As a whole the vehicle routing and guidance system advantageously divides the work required for navigation of the vehicle between internal navigation system in the vehicle and the central server 12. The powerful processor 17 of the central server 12 performs the comparatively difficult calculation of the route 16 and its continuous updating, even after the start of the journey from the starting point A. Thus a dynamic guidance of the vehicle is possible, since updated traffic information 18 is considered during set up or change of the route 16. The autonomous navigation system of the vehicle only needs to have a small memory capacity, since the route is only stored piecewise with respect to regions 20 to 30. The navigation system only detects the autonomous intermediate destinations at the transition points, that are not known to the operator, since they are subordinated to the reaching of the final destination B.

A deviation of the vehicle from the predetermined route 16 is detected by the central server 12 by means of a self-location of the vehicle, so that immediate influences can be immediately taken into consideration for an eventual change of route 16 during preparation of the navigational information. Either the information that the original predetermined route 16 was abandoned is transmitted to the operator of the vehicle or a new route 16 is prepared internally, which means not known to the operator of the vehicle and copied to the navigation system. Changes in the subsequent regions 20 to 30 resulting from the changes of the route 16 are then considered internally by the central server 12, when the sections of the route 16 passing through the respective regions 20 to 30 to be later traversed are transmitted on reaching the respective transition points.

Figure 2:
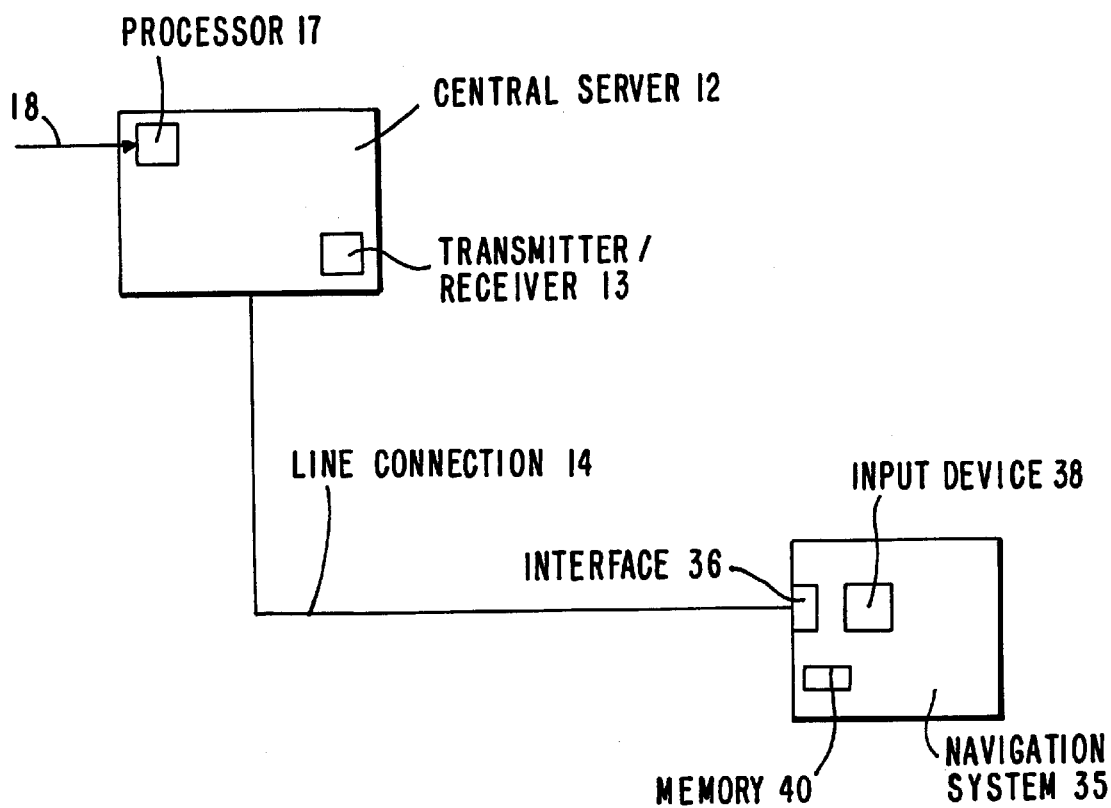
FIG. 2 is a simplified block diagram of a vehicle routing and guidance system according to the invention.

An additional embodiment of the vehicle routing and guidance system according to the invention is shown schematically in FIG. 2. The same parts as in FIG. 1 are provided with the same reference number in FIG. 1 and are not explained in further detail.

According to the embodiment shown in FIG. 2 the autonomous navigation system 35 of the vehicle is connected with the central server 12 by a communications link 14 before the start of the trip. The communications link 14 can be a line connection, such as a telephone line, a broad band cable or similar connection, in this case. Furthermore the radio link illustration in FIG. 1 to the central server 12 can also occur. The navigation system 35 has an interface 36, by which communication with the central sever 12 is possible. The destination B is transmitted to the central server 12 by means of an input device 38. The optimum route 16 is determined by the processor 17 of the central sever and transmitted to the navigation system 35. The navigation system 35 has a memory unit 40, in which the navigational information transmitted according to the route 16 can be stored. Since a loading of the route 16 in the memory unit 40 can occur shortly prior to the start of the trip or journey, the updated traffic information 18 from the processor 17 can be considered in planning the optimum route 16.

In practice either the memory 40 of the navigation system 35 is portable, for example in the form of a diskette or CD-ROM or DVD, which is insertable in a suitable data processing unit for storing the actual route 16 or the navigation system 35 is coupled directly with the communications link 14 via the interface 36. Since only the actual route 16 is stored in the memory 40, the memory capacity can be reduced to a required minimum, since the entire map 10 (FIG. 1) with all the eventual possible destinations does not need to be stored in it.

If necessary the memory 40 can store several routes usually used as standard routes by the vehicle. By connection to the central server 12 shortly prior to the start of the trip an update of the route 16 can take place, whereby the actual traffic information currently available in the central server 12 is considered in planing the route 16. Also the advantage that the entire road network with all its destinations does not need to be made available or stored in the navigation system 35 results.

A combination of the embodiments of FIGS. 1 and 2 for the vehicle routing and guidance system is possible. Thus prior to the start of the journey a route 16 corresponding to a selected destination B can be loaded into the navigation system 35, by means of an line-type communications link 14, for example by means of an ISDN. The actual position of the vehicle is monitored by the central server 12 by means of a self-location performed by the vehicle during its travel over the route 16 from the starting point A to the destination B. Only when changes in the route 16 in individual regions 20 to 30 through which the route 16 passes occur in the intervening time, which means after loading the route 16, an appropriate data exchange and correction of the route 16 occurs in the navigation system 35 by means of updated traffic information 18. The data exchange is kept to a minimum during travel because the data exchange only concerns the eventually required changes in the route 16.

The present invention is not limited to the above-described embodiments. For example, it is also possible to input several destinations, instead of a single destination B, with the help of knowledge from a customer service representative, or with commercial carriers, whereby the central server 12 determines an optimum route 16 for travel to several destinations.

The disclosure in German Patent Application 197 37 256.2-32 of Aug. 27, 1997 is incorporated here by reference. This German Patent Application, at least in part, describes the invention described hereinabove and claimed in the claims appended hereininbelow and provides the basis for a claim of priority for the instant invention under 35 U.S.C. 119.

While the invention has been illustrated and described as embodied in a vehicle routing and guidance system, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. A vehicle routing and guidance system comprising
a vehicle-based navigation system (35) located in a vehicle, said navigation system (35) including an input device (38) for entry of at least one destination (B) to which the vehicle is to travel and a self-locating means for determining location of the vehicle,
a central server (12) located outside of said vehicle for making navigational information available to the navigation system, said central server including means for calculating a route (16) to said at least one destination (B) and means for dividing the route (16) into route sections (34), and
transmitter and receiver means for at least temporarily establishing communication between the central server (12) and the navigation system (35), said transmitter and said receiver means including means for transmitting said route sections (34) individually and separately to said navigation system (35) so that said route (16) is transmitted in a piecewise manner to said navigation system.

2. The vehicle routing and guidance system as defined in claim 1, wherein the central server (12) includes means for selecting an individual one of said route sections (34) for transmission according to said location of said vehicle determined in said navigation system (35).

3. The vehicle routing and guidance system as defined in claim 1, wherein the central server (12) includes means for ascertaining an actual location of the vehicle.

4. The vehicle routing and guidance system as defined in claim 2, wherein the central server (12) includes means for considering new traffic information (18) arising after start of travel of the vehicle over said individual one of said route sections (34) in order to change remaining ones of said route sections (34) of the route (16) still to be traveled over by the vehicle according to the new traffic information.

5. The vehicle routing and guidance system as defined in claim 1, wherein the central server (12) includes means for storing a map (10) including regions (20, 22, 24, 26, 28, 30) through which the route sections (34) pass, wherein the regions have predetermined boundaries according to choice.

6. The vehicle routing and guidance system as defined in claim 5, wherein the vehicle is operated by an operator and the central server (12) includes means for transmitting a transition point (32) on the route (16) between two of the regions (20,22,24,26,28,30) bordering each other to the navigation system (35) as an autonomous intermediate destination hidden from the operator of the vehicle.

7. The vehicle routing and guidance system as defined in claim 6, wherein the navigation system (35) has means for erasing one of said route sections (34) already present in the navigation system (35) when a new one of said route sections (34) is transmitted to the navigation system (35).

8. The vehicle routing and guidance system as defined in claim 6, wherein said self-locating means for the location of the vehicle includes means for determining a deviation of an actual position of the vehicle from the route (16) and the central server (12) includes means for automatically taking into account a change of the route (16) resulting therefrom.

9. A vehicle routing and guidance system comprising
a vehicle-based navigation system (35) located in the vehicle,
a central server (12) located outside of said vehicle for making navigational information available to the navigation system, said central server including means for calculating an updated route (16) to at least one predetermined destination (B) and means for establishing a communication link (14) between the navigation system (35) and the central server (12) prior to start of travel of the vehicle for transmission of said updated route (16) for vehicle travel to the at least one predetermined destination (B) from the central server (12) to the navigation system (35), and
transmitter and receiver means for at least temporarily establishing communication between the central server (12) and the navigation system (35).

10. The vehicle routing and guidance system as defined in claim 9, wherein the navigation system (35) has a memory (40) including means for storage of a plurality of individually selectable routes (16) that are updated by the central server (12) by means of the communications link (14).

11. The vehicle routing and guidance system as defined in claim 9, wherein the communications link (14) is wireless or a wire connection.

12. The vehicle routing and guidance system as defined in claim 9, wherein the central server (12) includes means for copying the updated route (16) to the navigation system (35) in separate route sections (34) and means for transmitting changes in remaining ones of said route sections (34) still not traveled over by the vehicle during travel of the vehicle to the navigation system.

13. The vehicle routing and guidance system as defined in claim 9, wherein said at least one destination (B) consists of a plurality of destinations and the central server (12) includes means for calculating the updated route for travel of the vehicle to all of said destinations.

14. The vehicle routing and guidance system as defined in claim 1, wherein the vehicle is operated by an operator and the navigation system (35) has a digital speech synthesizer for informing said operator of said route sections.

15. The vehicle routing and guidance system as defined in claim 9, wherein the vehicle is operated by an operator and the navigation system (35) has a digital speech synthesizer for guiding said operator over said updated route.

16. The vehicle routing and guidance system as defined in claim 5, wherein said predetermined boundaries of said regions of said map are characterized by having predetermined travel-specific border conditions.

17. The vehicle routing and guidance system as defined in claim 6, wherein said central server transmits a following one of said route sections to said navigation system when said vehicle reaches said transition point (32) after traversing one of said route sections.

18. A vehicle routing and guidance system comprising
a vehicle-based navigation system (35) located in a vehicle, said navigation system (35) including an input device (38) for entry of at least one destination (B) to which the vehicle is to travel, means for informing a driver of the vehicle of a calculated route (16) to said at least one destination (B) and a self-locating means for determining a location of the vehicle;
a central server (12) located outside of said vehicle, said central server including means for calculating said calculated route (16) to said at least one destination (B), means for dividing said calculated route (16) into separate route sections (34), means for selecting individual ones of said route sections (34) one after the other for transmission to said vehicle according to said location of said vehicle during travel to said at least one destination (B) and means for recalculating remaining ones of said route sections (34) over which said vehicle has not traveled during travel to said at least one destination according to updated traffic information supplied to said central server (12); and
transmitter and receiver means for at least temporarily establishing communication between the central server (12) and the navigation system (35), said transmitter and said receiver means including means for transmitting said route sections (34) individually and separately to said navigation system so that said calculated route is transmitted in a piecewise manner to said navigation system.

* * * * *